US006725502B2

(12) United States Patent
Moll

(10) Patent No.: US 6,725,502 B2
(45) Date of Patent: Apr. 27, 2004

(54) HINGE FOR PIVOTING A FLAP AND A METHOD OF USING AND MAKING SAME

(75) Inventor: Patrick Moll, München (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/871,820

(22) Filed: Jun. 4, 2001

(65) Prior Publication Data

US 2002/0010979 A1 Jan. 31, 2002

(30) Foreign Application Priority Data

Jun. 2, 2000 (DE) ........................................ 100 27 570

(51) Int. Cl.[7] ............................ E05F 3/20; B60K 15/05

(52) U.S. Cl. .................................. 16/50; 16/354; 16/85

(58) Field of Search ................................ 16/50, 54, 62, 16/68, 69, 354, 85; 296/97.22; 220/86.2

(56) References Cited

U.S. PATENT DOCUMENTS 5,673,658 A * 10/1997 Allmendinger .......... 123/90.12
6,106,049 A * 8/2000 Cole et al. ............... 296/97.22

FOREIGN PATENT DOCUMENTS

| | | | | |
|---|---|---|---|---|
| DE | 4302502 | | 5/1994 | |
| DE | 19517706 | A1 * | 11/1996 | ........... B60K/15/05 |
| DE | 019818530 | A1 * | 11/1998 | ........... E65D/43/16 |
| DE | 19934629 | | 2/2001 | |
| DE | 19957967 | A1 * | 6/2001 | ........... B60K/15/05 |
| EP | 0796755 | A1 * | 9/1997 | ........... B60K/15/05 |
| EP | 0901927 | A1 * | 3/1999 | ........... B60K/15/05 |
| JP | 407257203 | A * | 10/1995 | ........... B60K/15/05 |
| JP | 08100553 | * | 4/1996 | ........... E05B/65/12 |

* cited by examiner

*Primary Examiner*—Robert E. Pezzuto
*Assistant Examiner*—Alexandra K. Pechhold
(74) *Attorney, Agent, or Firm*—Crowell & Moring LLP

(57) ABSTRACT

A hinge for pivoting a flap, and in particular, to a hinge for pivoting a flap on a motor vehicle. The hinge aids the closing of the flap and includes two linkages or legs which are arranged rotatably around at least one axis of rotation and are connected with one another. A transmission is arranged for transmitting a torque formed during a closing movement of the hinge to a flywheel mass for the accumulation and subsequent aiding and continuation of the closing movement.

17 Claims, 1 Drawing Sheet

HINGE FOR PIVOTING A FLAP AND A METHOD OF USING AND MAKING SAME

BACKGROUND AND SUMMARY OF THE INVENTION

This application claims the priority of foreign application number 100 27 570.2, filed in Germany on Jun. 2, 2000, the disclosure of which is expressly incorporated by reference herein.

The invention relates to a hinge for pivoting a flap, and, in particular to a hinge for pivoting a flap on a motor vehicle having two linkages or legs which are rotatably connected with one another about at least one axis of rotation.

Within the scope of the present invention, the term "flap" includes all types of flaps, doors, lids or other covers which are conventionally connected with the body of a motor vehicle by way of an articulated joint.

According to the prior art, conventional flaps must be set in motion such that during a closing movement they fall into a lock at a minimum speed. The kinetic energy connected with this minimum speed must be sufficiently high in order to press together in a large-surface manner, for example, the sealing of a vehicle body opening to be covered, so that the lock is reliably caused to engage. Only then will the flap close off the vehicle body opening in a secure and sufficiently tight manner.

Additional energy is required for overcoming the friction in the system which must be applied manually by the user. If the flap is closed by way of a handle situated on an interior side, this handle has to be released at a relatively early point in time in order to prevent a pinching of the hand. Since the angle of the flap opening is still relatively large, the flap must already be set into a relatively high-speed motion at this point in time, for example, 1.5 m/s at a rear edge of the flap, in the case of a rear flap. This is often relatively difficult and always carries the risk of contusions.

It is therefore an object of the present invention to provide a hinge of the above-mentioned type having a new mechanical design which aids the closing of a flap. In addition, it should be possible to upgrade known hinges in a simple manner by means of the arrangement according to the invention.

According to the invention, this object is achieved by providing a hinge having a transmission arranged for transmitting a torque occurring during a closing movement of the hinge to a flywheel mass for an intermediate accumulation and subsequent aiding and continuation of the closing movement.

The closing of a flap in a hinge according to the invention is aided by an accumulation of energy during the initial closing movement and a subsequent delivery of this energy after the flap has been let go. Accordingly, a hinge according to the invention comprises, in addition to the actual hinged joint, a transmission which is mechanically coupled with the hinge and includes a flywheel mass. During the movement of the flap at the start of the closing movement, the flywheel mass is caused to carry out a rotary motion. After the flap is released, the energy accumulated in the flywheel mass causes a complete closing at a speed which, in comparison to arrangements according to the prior art, is clearly lower. The resistance of the above-mentioned energy-absorbing structural elements, such as the seal, the air resistance, the bearing friction and the balance of weight, is overcome by the available energy which is intermediately stored in the rotary motion of the flywheel mass.

In principle, a unit comprising a flywheel mass and a transmission, in the following is also called a flywheel transmission and is constructed such that it can also be used on a hinge as a separate and subsequently mounted structural element. Thus, a hinge can be retrofitted to form a flywheel transmission according to the invention. However, a hinge is preferably equipped directly with a flywheel transmission and, in the following, is therefore called a hinge according to the invention.

The transmission with a flywheel mass is situated in an area which is in each case suitable for introducing a torque. Advantageously, according to the available space in an embodiment with very limited space, the flywheel transmission and the hinge are coupled with one another by way of a cardan shaft. However, a compact construction is preferable, in which the flywheel transmission is arranged directly in or on the hinge with a direct mechanical coupling, preferably in the area of an axis of rotation of the hinge.

Also in the case of a small mass or flywheel mass, sufficient energy can be stored in the form of a rotary movement because of a corresponding rotational speed, in order to change the hinge also against the above-described resistances into its closed position or closing position. As a result, an additional mass is added to the weight of the rear flap which does not weigh much itself. For this purpose, the transmission is constructed as a step-up gearing.

The hinge of the flap or door may be a single-joint hinge, a four-joint hinge, a multiple-joint hinge or a gearwheel-type hinge. However, any other joint concept or hinge concept can be used in which rotary motions occur internally which are suitable for controlling a flywheel transmission according to the invention.

In an embodiment of a hinge according to the invention, the flywheel transmission is mounted on the flap side. Thus, for example, when arranged on a trunk lid, it does not present an obstacle during the installation as well as during the loading of a trunk equipped in this manner. In this case, the flywheel transmission introduces its torque into the vehicle-body-fixed part of the hinge or into an element of a multiple-joint hinge or directly by way of a force transmission into the vehicle body.

However, advantageously, the flywheel transmission can also be mounted on the vehicle body or the vehicle-body-fixed part of the hinge so that the pivoted flap is relieved by the additional component. The construction must then be aimed at the fact that a torque or a force must be introduced or transmitted from the site of the flywheel transmission on the vehicle body by way of a lever into the flap or an element of the hinge or of a multiple-joint hinge.

In another embodiment, the flywheel transmission is fastened on an element of a multiple-joint hinge or other hinge. In this case, the flywheel transmission introduces its torque directly or introduces a force by way of a lever into another element of the hinge. A direct introduction of force from the flywheel transmission into the vehicle body or into the flap is also conceivable, a distance from the point of the introduction of force to the pivot serving as the lever arm.

According to a preferred embodiment, when the flap is operated in an unusual to unauthorized manner, an excessive force can act upon the flywheel transmission. This may result in damage or require an unnecessarily solid construction. The danger of excessive pinching forces when closing the flap can also have a negative effect. In a further preferred embodiment, the driving torque is therefore limited by the interposition of an overload clutch if torques occur which are unnecessarily high for the normal operation. As a result, while using simple mechanical elements, a force limitation is implemented in the smallest additional space. Simultaneously, as a result of this measure for combating danger, the entire construction can have a weaker dimensioning.

For improving the comfort during the opening, a counterweight is provided on the flap in the case of known flaps. This counterweight aids the movement of the flap at least during the start of the movement so that not the entire force must be applied manually. As a device for balancing the weight, a spring element in the form of a pneumatic spring may, for example, be provided. However, during the closing, the pneumatic spring simultaneously has to be prestressed for the closing movement. For this purpose, additional energy must therefore be applied during the closing movement. By means of a conventional mechanical design, the target conflict resulting from the above-mentioned requirements between a good closing comfort and simultaneously a good opening comfort can be solved only insufficiently. Particularly, a manual operation of a flap is made still more difficult. In a further preferred embodiment of the present invention, the opening in the case of a hinge according to the invention is not significantly impaired. For this purpose, a deactivation of the flywheel drive of the hinge takes place during the opening in order not to impair the comfort of the operation in this phase. By means of a free-wheel device which, during the closing of the flap, is preferably bridged by a centrifugal clutch, the flywheel transmission is uncoupled only during the flap opening movement. As soon as the transmission is caused to rotate during the closing, the free-wheel device is bridged also in its operating direction, thus in the direction of the free wheeling. Now, during the braking of the flywheel, the additional accumulating device can introduce its torque into the flap under the effect of the centrifugal clutch by way of the transmission.

According to another preferred embodiment of the invention, a movable abutment is provided on the transmission route of the flywheel transmission. Starting from a certain position of the flap, the abutment is switched to be rotatable by way of an unlocking device, such as a locking block. Furthermore, as an alternative, electrical, mechanical or hydraulic devices can be provided for this purpose.

In addition, in the case of elastic hinge or flap constructions, large elastic deformations of individual or several components may occur as a result of the required torque of the flywheel transmission of a hinge according to the invention. The implementation of the above-mentioned characteristics is an effective remedy, so that a further strengthening of the construction will not be necessary.

According to another preferred embodiment, by way of this abutment, which rotates starting from a certain position, the rotating motion is converted to a translational motion. By means of a guidance of force, this translational motion drives a pull-shut device, for example, by way of a rod or a Bowden cable. This pull-shut device is integrated in the vicinity of the flap or the door, or directly in the lock. The pull-shut device has the purpose of more directly introducing the required torque for compressing the flap sealing or door sealing for overcoming the friction of the structural elements and of the lock engaging forces, for example, in the proximity of or directly in the lock. This force can be introduced more effectively compared to the prior art.

In a further preferred embodiment, the pull-shut device is constructed as a lever with an abutment, for example, a sloping ramp and/or a connecting link on the flap in the area of the lock, or is constructed as a mechanism which has the same effect. The pull-shut device is preferably driven by an abutment of a joint according to the invention, which abutment is rotatably released in this position. In a preferred embodiment, the rotating movement of the abutment is converted into a translational movement by way of a coupled compression member, by way of which translational movement, a free end of the compression member in the area of the lock on the flap moves over a sloped flank for generating a very high closing force.

By way of the above-mentioned locking block, this pull-shut device is preferably released only when the flap is almost closed. In this condition, a flap, such as a trunk lid, is already closed so far that a pinching is no longer possible. In particular, a gap at the trunk is already closed in such a condition. Because of the pull-shut device which operates subsequently, the speed of the flap can be reduced in comparison to a normally required closing speed such that the flap reliably continues to move only under the effect of all the above-mentioned counterforces. On the other hand, in the event of a pinching risk, it should be possible to securely brake the flap without the occurrence of injuries caused by pinching. Thus, at this point of the moving sequence, the closing speed can be lowered to below 1 m/s, in which case, without the pull-shut device, speeds of approximately 1.5 m/s would be required.

After the pull-shut operation, the pull-shut device can be moved back into its starting position. Using the above-described combination of the free-wheel clutch and the centrifugal clutch, after the conclusion of the closing operation with the decaying of the effect of the driving torque of the flywheel transmission, a weak spring will be sufficient for resetting the pull-shut device and thereby also moving the movable abutment of the flywheel transmission into a starting position for a new opening operation. Thus, a flywheel transmission or hinge according to the invention is virtually immediately available after the secure closing without any significant waiting period for a new opening. This characteristic is very significant in the daily practice because users very frequently, for example, close a trunk and then open it up again immediately in order to check the just loaded content.

Advantageously, a joint or hinge according to the invention can be used in all rear flaps and swivel doors, etc. which have no fully automatic flap closing device. In addition to rear flaps on automobile, all doors, particularly swivelling doors to be opened in the upward direction, can therefore be closed and opened more easily by hand. A use of a joint according to the invention is also conceivable in the case of forward flaps and/or cabs of trucks. A distribution of forces changed by inclination or sloping is automatically compensated by the above-described characteristics of a hinge according to the invention.

The invention is particularly significant for flaps which open automatically after the triggering of a closing device, for example, by way of remote unlocking from a distance of over 5 m. Here, the opening operation is caused after the operation of the lock, for example, by a pneumatic spring, in which case this operation is not at all hindered or impaired by a joint according to the invention. After the loading, the closing movement is advantageously aided as described above.

Other objects, advantages and novel features of the present invention will become apparent from the following detailed description of the invention when considered in conjunction with the accompanying drawings.

DETAILED DESCRIPTION OF THE DRAWINGS

Figure 1:
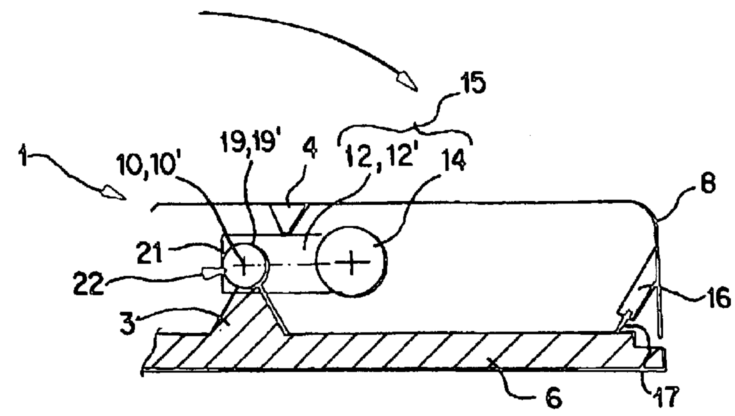
FIG. 1 is a schematic representation of a hinge according to an embodiment of the invention arranged in a closed condition.

By way of a vehicle-body-side linkage 3 and a flap-side linkage 4, a hinge 1 is arranged as an articulated connection between a motor vehicle body 6 and a flap 8. In its basic form illustrated in FIG. 1, the hinge 1 has an axis of rotation 10 in which area a transmission 12 is coupled such that, when the flap 8 is moved with respect to the vehicle body 6, a torque is transmitted by way the transmission 12 to a flywheel mass 14.

In order to minimize the mass, particularly the flywheel mass 14, the transmission 12 is equipped with a corresponding step-up gearing 121. As a result, a high energy accumulation is achieved by means of a high rotational speed while the weight of the additional components is simultaneously low. When in use, the flywheel mass 14 accumulates rotational energy in a starting phase of a closing movement by way of the transmission, which rotational energy is applied by the user by hand when moving the flap 8. In a second phase of the closing movement in which the user has already let go of the flap 8, this energy is released again by the flywheel mass 14 as the intermediate accumulator in the form of a torque about the axis of rotation 10 for aiding and continuing the closing movement. This second phase is concluded with the engagement of a lock 16 with a shackle 17.

During the operation or during the movement of the flap 8, the flywheel transmission 15 formed by the transmission 12 and the flywheel mass 14 generates a running noise. By constructive measures, this running noise is constructed in a targeted manner as a warning sound so that the user and/or another person situated in the danger range of the closing flap 8 will be warned. As the constructive measures, the step-up gearing 121 of the transmission 12 is selected such that the occurring running noise is situated in a frequency range which is clearly audible to human beings, so that the warning sound will still be clearly audible also in the event of ambient noise, for example, on a busy street. Because, in the embodiment of FIG. 1, the flywheel transmission 15 is arranged in the area of the flap 8, hollow spaces, which are situated in the area of struttings or bracings of the flap 8, which are not shown in detail, are utilized in a targeted manner as resonance spaces in the arrangement of the flywheel transmission 15.

The transmission 12 also comprises a clutch 19 or an overload clutch 191 by which the torque is limited when a certain load is exceeded. Thus, the flap 8 and the hinge 1 are protected against an overloading, in which case the bearing components of the hinge arrangement can be dimensioned to be weaker. The limiting torque can be adjusted at the clutch 19 for an adaptation to a respective application, so that a standardized flywheel transmission 15 can be used on hinges 1 for the linking of flaps of different sizes and weights.

In addition, the transmission 12 has a free-wheel device 21 which deactivates the transmission 12 during the opening of the hinge 1. During the opening, the flywheel transmission 15 would act as a brake, which would be undesirable. On the other hand, so that the free-wheel device 21 will not respond during the transition from the above-described first phase into the second phase of a closing movement, the free-wheel device 21 is coupled with a centrifugal clutch 22. Thus, in this preferred embodiment, the transmission 12 is activated only during the closing of the flap 8 without being hindered during an opening movement by the flywheel transmission 15, which opening movement is aided by elements, such as a pneumatic spring, which are not shown in detail in the figures.

The transmission 12 may be coupled with an axis of rotation 10 of the hinge 1 by way of a cardan shaft 101. This alternative construction is particularly advantageous when retrofitting the hinge 1 because it is flexibly adaptable. As illustrated in FIG. 1, in a compact construction, the flywheel transmission 15 is arranged in an area around an axis of rotation 10 of the hinge 1.

In addition, the flywheel transmission 15 can be fastened on an element of a multiple-joint hinge or a hinge of a different type or of a rod-type mechanism which is not capable of revolving. A flywheel transmission 15 is adaptable such that the legs or linkages 3, 4 of the hinge 1 can remain untouched by the changes as a result of the integration of the flywheel transmission 15.

Figure 2:
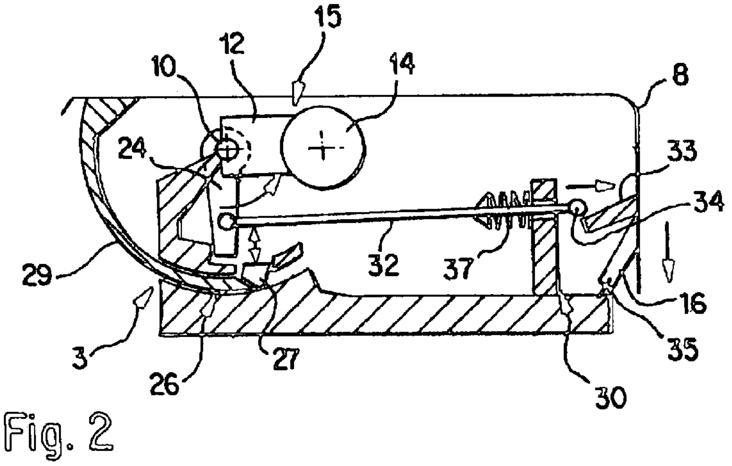
FIG. 2 is a schematic view of another embodiment of the hinge according to the invention having a free-wheel device.
Figure 3:
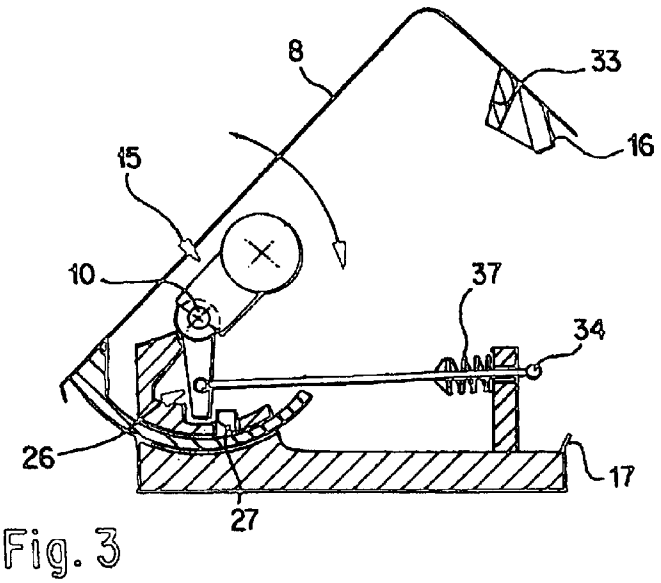
FIG. 3 is a schematic view of a further variation of FIG. 2 in an open position.

FIGS. 2 and 3 illustrate another embodiment of a hinge 1 which is based on FIG. 1. Here, a movable abutment 24 is provided in the area of the vehicle-body-side linkage 3 in a mechanical transmission path between the hinge 1 and the flywheel transmission 15. Starting from a certain position of the flap 8, the abutment 24 is rotatable by way of an unlocking device 26. The unlocking device 26 comprises a locking block 27 which is displaceable by way of a connecting link 29 coupled with the flap 8, as illustrated by the double arrow in FIG. 2. In the position outlined in FIG. 2, as a result of its weight or aided by a spring element or a similar device, the locking block 27 is in a passive position. As a result, the lever-shaped abutment 24 is released so that, for concluding the closing movement of the flap 8, it is moved around the axis of rotation 10 by means of the flywheel transmission 15 freely in the direction of the indicated arrow.

FIG. 3 shows an open position of the flap 8 in which the connecting link 29 has lifted the locking block 27 and has therefore fixed the abutment 24 in the area of the vehicle-body-fixed linkage 3. Thus, the flywheel transmission 15 is available during the closing of the flap 8.

Furthermore, the unlocking device 26 is mechanically coupled with a pull-shut device 30 which is integrated in a vicinity of the lock 16 of the flap 8. For this purpose, the pull-shut device 30 has a lever 32 which is driven by the unlocking device 26 and has an abutment 33, in which case the abutment 33 is constructed particularly as a sloping ramp and/or connecting link on the flap 8 in an area of the lock 16, as shown in FIG. 3. The pull-shut device 30 is constructed for converting a rotating movement of the abutment 24 by way of a linked lever 32 into a translational movement. As a result, a free end 34 of the lever 32 slides along close to the lock 16 on the flap 8 on the abutment 33 and generates a very high closing force, as shown in FIG. 2 with corresponding arrows on the lever 32 and the flap 8.

For safety reasons, the pull-shut device 30 is released only when the flap 8 is almost closed or is activated for generating a high closing force. Advantageously, a gap 35 is provided on the trunk which gap is already overlapping in this condition and thus prevents a pinching of body members. The closing force for the lock 16 is therefore built up only along an extremely short moving path of the flap 8, in which case injuries by pinching or contusions can largely be excluded. As a result of the pull-shut device 30, the speed of the flap 8 can be reduced greatly until the closed position is reached, so that, shortly before the closing of the gap 35, the flap a can be moved only at a very low speed and can still be braked by an object situated in the area of the gap 35 or, for example, manually without any large expenditure of force. The force required for the closing is provided along a very short path only by way of the pull-shut device 30, whose triggering, as described above, depends only on the position of the flap 8. Also in the case of a very slow closing, the pull-shut device 30 does not hinder the operation, as illustrated by the position shown in FIG. 2. In this case, the free end 34 and the ramp 33 are not in contact and the pull-shut device would be activated only subsequently.

A spring element 37 for setting back the pull-shut device 30 and the movable abutment 24 of the flywheel transmission 15 is arranged at the pull-shut device 30 in a starting position for a new opening operation. Because of the deactivation of the flywheel transmission 15 by way of the free-wheel coupling 21 and the centrifugal clutch 22, the spring element 37 has a rather weak construction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hinge for pivoting a flap, comprising:

two linkages or legs which are rotatably connected with one another about at least one axis of rotation;

wherein a transmission is arranged for transmitting a torque occurring during a closing movement of the hinge to a flywheel mass for an intermediate accumulation and subsequent aiding and continuation of the closing movement; and wherein the transmission is constructed as a step-up gearing.

2. A hinge for pivoting a flap, comprising:

two linkages or legs which are rotatably connected with one another about at least one axis of rotation;

wherein a transmission is arranged for transmitting a torque occurring during a closing movement of the hinge to a flywheel mass for an intermediate accumulation and subsequent aiding and continuation of the closing movement; and wherein a running noise formed by the transmission is developed as a warning sound in an area of the hinge.

3. A hinge for pivoting a flap, comprising:

two linkages or legs which are rotatably connected with one another about at least one axis of rotation;

wherein a transmission is arranged for transmitting a torque occurring during a closing movement of the hinge to a flywheel mass for an intermediate accumulation and subsequent aiding and continuation of the closing movement; and wherein a unit comprising the transmission and the flywheel mass is fastened as a flywheel transmission on an element of one of a multiple-joint hinge and a hinge.

4. A hinge for pivoting a flap, comprising:

two linkages or legs which are rotatably connected with one another about at least one axis of rotation;

wherein a transmission is arranged for transmitting a torque occurring during a closing movement of the hinge to a flywheel mass for an intermediate accumulation and subsequent aiding and continuation of the closing movement; and wherein the transmission has a clutch or an overload clutch by which the torque is limited when a certain load is exceeded.

5. The hinge according to claim 4, wherein the limiting torque can be adjusted at the clutch.

6. A hinge for pivoting a flap, comprising:

two linkages or legs which are rotatably connected with one another about at least one axis of rotation;

wherein a transmission is arranged for transmitting a torque occurring during a closing movement of the hinge to a flywheel mass for an intermediate accumulation and subsequent aiding and continuation of the closing movement; and wherein the transmission has a free-wheel device which deactivates the transmission when the hinge is opened.

7. The hinge according to claim 6, wherein the transmission comprising the free-wheel device is coupled with a centrifugal clutch.

8. A hinge for pivoting a flap, comprising:

two linkages or legs which are rotatably connected with one another about at least one axis of rotation;

wherein a transmission is arranged for transmitting a torque occurring during a closing movement of the hinge to a flywheel mass for an intermediate accumulation and subsequent aiding and continuation of the closing movement;

wherein a movable abutment is provided on a transmission path of the transmission, which abutment is rotatable as a function of a position of the flap by way of an unlocking device; and wherein the unlocking device is mechanically coupled with a pull-shut device which is integrated in an area of a lock of the flap.

9. The hinge according to claim 8, wherein the pull-shut device comprises a lever which is driven by the unlocking device and has an abutment, the abutment being constructed as a sloped ramp or a connecting link on the flap in an area of the lock.

10. The hinge according to claim 8, wherein the pull-shut device is arranged to convert a rotating movement of the abutment by way of a pivoted lever into a translational movement, a free end of the lever being provided in the area of the lock on the flap by way of an abutment in the form of a sloped flank for generating a very high closing force.

11. The hinge according to claim 8, wherein the pull-shut device is released when the flap is substantially closed.

12. The hinge according to claim 8, wherein a spring element is arranged on the pull-shut device for resetting the pull-shut device and the movable abutment of the flywheel transmission into a starting position for a new opening operation.

13. A hinge arrangement for pivoting a flap comprising:

an articulated connection between a body-side linkage and a flap-side linkage forming a hinge, the articulated connection comprising an axis of rotation;

a transmission coupled to the hinge; and a flywheel mass operatively arranged with the transmission;

wherein, when the flap-side linkage is moved with respect to a body-side linkage, a torque is transmitted by way of the transmission to the flywheel mass to initially accumulate rotational energy and to subsequently aid a closing movement of the hinge.

14. The hinge arrangement according to claim 13, wherein a movable abutment is operatively arranged with the transmission and is rotatable as a function of the flap by way of an unlocking device.

15. The hinge arrangement according to claim 14, wherein the unlocking device is coupled with a pull-shut device which is arranged to engage a lock of the flap.

16. A method of making a hinge arrangement for pivoting a flap, comprising:

providing an articulated connection between a body-side linkage and a flap-side linkage forming a hinge;

coupling a transmission to the hinge; and operatively arranging a flywheel mass with the transmission such that when the flap-side linkage is moved with respect to a body-side linkage, a torque is transmitted by way of the transmission to the flywheel mass to initially accumulate rotational energy and to subsequently aid a closing movement of the hinge.

17. A method for pivoting a flap of a motor vehicle comprising:

providing an articulated connection between a body-side linkage and a flap-side linkage forming a hinge;

coupling a transmission to the hinge;

operatively arranging a flywheel mass with the transmission; and closing the flap such that the flap-side linkage is moved toward a body-side linkage to thereby transmit a torque by way of the transmission to the flywheel mass to initially accumulate rotational energy and to subsequently aid the closing movement of the hinge.

* * * * *